R. A. HIGGINS.
METHOD AND MEANS FOR FILLING POOLS AND TANKS.
APPLICATION FILED DEC. 18, 1905.
953,529.
Patented Mar. 29, 1910.
2 SHEETS—SHEET 1.
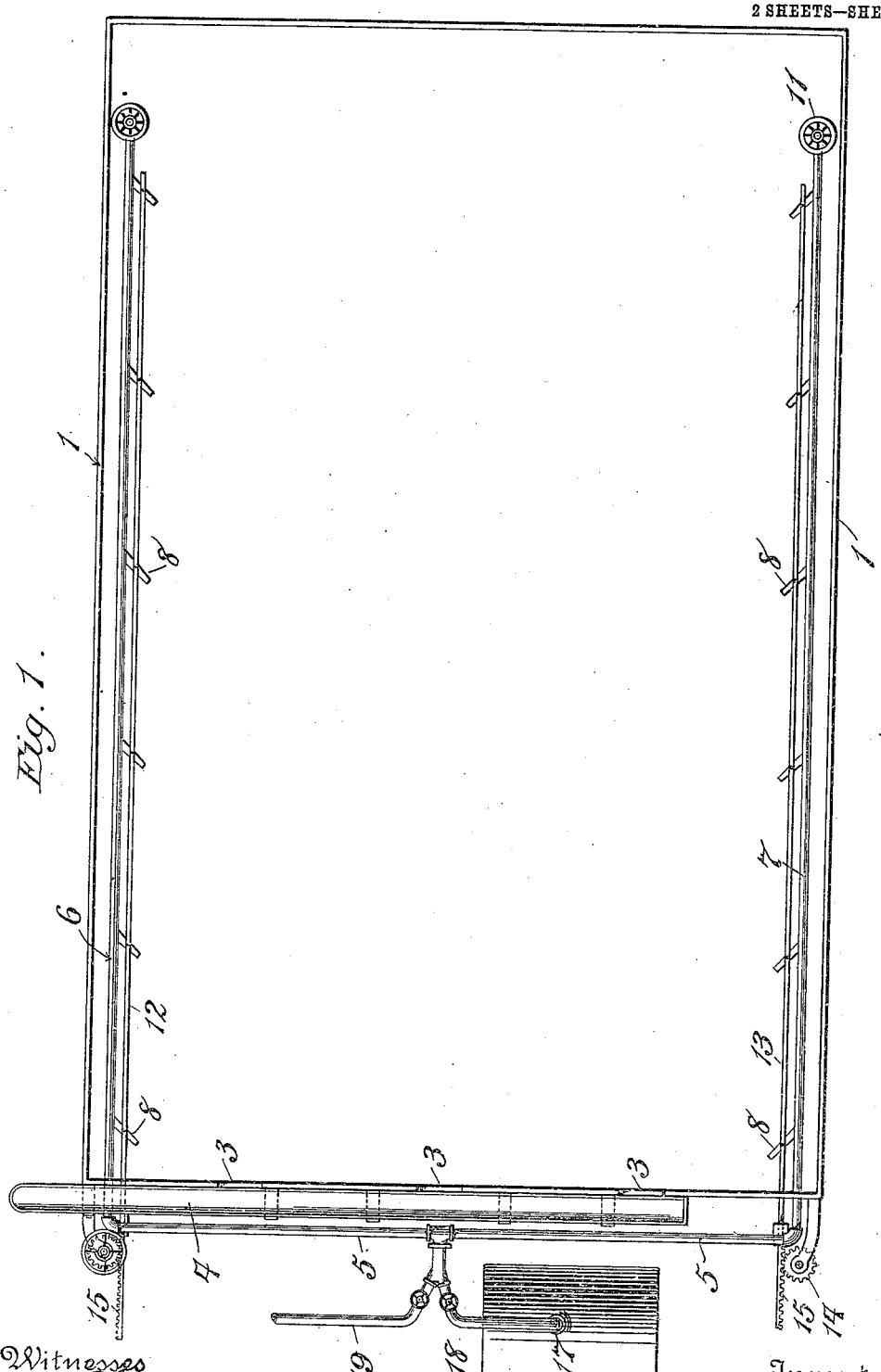

R. A. HIGGINS.
METHOD AND MEANS FOR FILLING POOLS AND TANKS.
APPLICATION FILED DEC. 18, 1905.
953,529.
Patented Mar. 29, 1910.
2 SHEETS—SHEET 2.
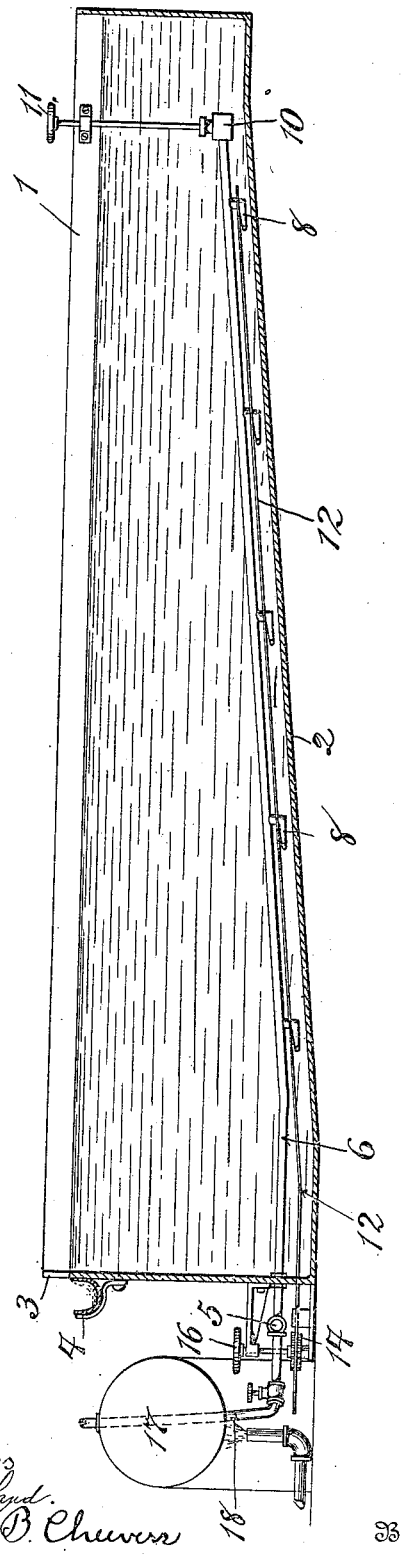
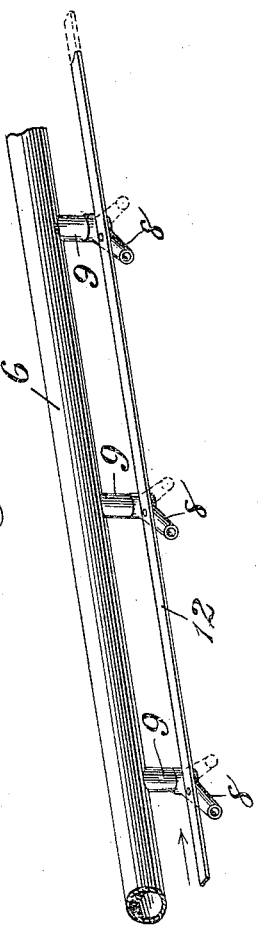
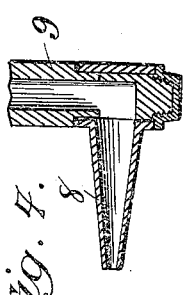

UNITED STATES PATENT OFFICE.

ROBERT A. HIGGINS, OF JERSEY CITY, NEW JERSEY.

METHOD AND MEANS FOR FILLING POOLS AND TANKS.

953,529.

Specification of Letters Patent. Patented Mar. 29, 1910.

Application filed December 18, 1905. Serial No. 292,165.

*To all whom it may concern:*

Be it known that I, ROBERT A. HIGGINS, a citizen of the United States, residing in Jersey City, New Jersey, have invented a certain new and useful Improvement in Methods and Means for Filling Pools and Tanks, of which the following is a specification.

This invention has relation to an improved method and means for establishing and maintaining uniform temperature in all parts of large bodies of water and particularly in swimming pools; and one of the principal objects of the invention is the provision of a method and means whereby the temperature in such large bodies of water can be uniformly economically and rapidly changed and brought to any desired point.

Great difficulty has been experienced in producing uniform temperature in artificial bodies of water, such as swimming pools, for the reason that the natural convective tendency is for the warm water to occupy the upper layers of the pool, and, even where heat is supplied at the bottom, the circulation due to convection produces a mass having different temperatures in different parts. This difficulty is greatly increased whenever it is found necessary to heat or cool the entire mass and this process has heretofore been inseparable from production of a non-uniform temperature in the mass, besides involving waste of heat and occupying a great deal of time.

The advantage of the present invention lies in the fact that it enables the user to change the temperature in a swimming pool of any size in a very short time with a very small waste of heat and while maintaining at the same time a uniform distribution of temperature.

The invention is illustrated in a preferred form in the accompanying drawings wherein—

Figure 1, is a plan view of a swimming pool provided with my device; Fig. 2 is a longitudinal section of the same; Fig. 3 is a perspective partial view of the means for changing direction of the jets and Fig. 4 is a sectional detail of a preferred form of jets.

In the drawings, the tank, which may have any desired form, is shown at 1, and in the case of a swimming pool is provided with an inclined bottom 2, and with appropriate overflows 3, at one end. The water which runs through these overflows, is led off by a trough 4, or other appropriate means.

The essential feature of the invention is found in supplying the water to the tank in the form of thin streams delivered under pressure through openings of small diameter relatively to the size of the feeding pipes and producing eddies whereby thorough agitation and mixture is produced. The apparatus therefore involves means for producing streams of considerable velocity for setting up whirlpools or eddies in the mass. For this purpose the water which enters by the main pipe 5, is led through two branches 6 and 7, along the sides of the swimming pool and, in the form shown, within and near the bottom thereof, and these branch feed pipes are supplied with short jet tubes 8, at appropriate intervals, through which the water is delivered under considerable pressure into the pool. These jet tubes discharge through relatively narrow openings and preferably take the form shown in Fig. 4. They project horizontally or nearly so, from short vertical branch pipes 9, being preferably arranged to turn upon said branch pipes, as shown in Fig. 4. The jet tubes 8 are preferably made conical so as to counteract the spreading tendency and to deliver a solid and powerful jet.

In filling the tank in the first instance it is preferred to use large valve-openings 10 at the ends of the branch pipes 6 and 7, which openings are controlled in any well known manner as for instance by hand wheel 11, at the top of the pool. When the pool is partly filled, these valves are closed and the jet tubes supply the water necessary for completing the operation of filling the pool. The frictional effect of the water jets is itself sufficient in many cases, and therefore the particular direction given to these jets is not material. As shown in the drawings the jet tubes are given a diagonal direction partly across the pool and partly toward one end. Where the jet tubes are not intended to be adjustable in position, it is preferred to direct them toward the overflow end of the pool. The effect of the jet of water projected from the jet tubes 8, is to produce whirlpools or eddies in the mass by interference of cross currents and also by virtue of the frictional or dragging tendency of each stream of water upon the mass of water into which it is projected, whereby this mass is given a rotary or whirling movement. It has been found that the effect of these eddies is felt all the way from the bottom to the top of the mass in the pool and the agitation resulting is found to prevent all separation into layers or columns of different temperatures. Practical use of this apparatus has demonstrated that it is possible to produce a degree of uniformity such that differences of even a fraction of a degree Fahrenheit are avoided.

By the use of this apparatus longitudinal currents are produced upon the surface of the pool whereby a cleaning action is secured. The direction of these currents will depend upon the direction of the jets 8, and, in order to control these currents under different circumstances, the jets 8, are made adjustable in position, preferably by the means shown in the drawings. These comprise connecting rods 12 and 13, extending parallel to the two pipes 6 and 7 and pivoted to the jet tubes 8. These rods are made movable longitudinally in any desired manner, as for instance, by the use of gears 14, engaging with racks 15, on said rods, which gears may be turned by hand wheels 16 or otherwise as desired. It is obvious that the apparatus described can be used to shift all the jet tubes together into any desired angular position as indicated in dotted lines in Fig. 3. By making any desired change in the positions of the jet tubes, their mode of operation in the production of eddies can be varied at will. Any desired means of supply can be used in combination with the apparatus so far described without departing from this invention. As an example there is found in the drawings a conventional heater 17, supplying hot water through the pipe 18, in combination with a cold water pipe 19, converging into the hot water supply. By these means water of any desired temperature can be forced under pressure into the supply pipe 5.

When it is desired to change the temperature in the pool, the change is rapidly effected by forcing through the jets 8, a relatively small amount of cold water or hot water according to circumstances, which is rapidly distributed uniformly throughout the whole pool so as to bring about the changes of temperature desired.

The proportion of the parts and the distance between successive jets will depend upon the proportions of the pool the depth of the water and the pressure available. In a pool 60 feet long, 20 feet wide and varying from 5 to 8 feet in depth, good results have been obtained by the use of jet tubes 4 feet apart, the water being supplied under a pressure of 70 lbs. The number and mutual direction of the jets are not material or essential elements of the invention.

Various changes may be made in the construction of this apparatus without departing from the scope of the invention, which is not to be limited to the details herein shown and described.

What I claim is—

1. A means for producing uniform temperature in a pool comprising a water pipe extending along said pool a number of conical jet tubes on said pipe inclined with relation to said pipe and means for supplying water under pressure to said pipe, substantially as described.

2. A means for producing a uniform temperature in a pool comprising a number of jet tubes along said pool, means for supplying water under pressure thereto and means for changing the direction of said tubes at will, substantially as described.

3. A means for producing uniform temperature in a pool comprising a water pipe extending along said pool, a number of rotatable jet tubes mounted upon said water pipe, means for supplying water under pressure to said pipe and means for simultaneously rotating said jet tubes to change their direction, substantially as described.

4. A means for producing uniform temperature in a pool comprising two pipes extending along said pool, rotatably mounted jet tubes upon both pipes, means for rotating the jet tubes on each pipe and means for supplying water under pressure to both of said pipes, substantially as described.

ROBERT A. HIGGINS.

Witnesses:
 HERBERT PINKHAM,
 HAROLD S. MACKAYE.